United States Patent
Maki

(10) Patent No.: US 9,506,995 B2
(45) Date of Patent: Nov. 29, 2016

(54) MAGNETIC FIELD ANALYSIS PROGRAMS AND MAGNETIC FIELD ANALYSIS METHODS

(75) Inventor: Kohji Maki, Tokyo (JP)

(73) Assignee: Hitachi, Ltd., Tokyo (JP)

(*) Notice: Subject to any disclaimer, the term of this patent is extended or adjusted under 35 U.S.C. 154(b) by 545 days.

(21) Appl. No.: 14/130,594

(22) PCT Filed: Jun. 5, 2012

(86) PCT No.: PCT/JP2012/064445
§ 371 (c)(1),
(2), (4) Date: Jan. 2, 2014

(87) PCT Pub. No.: WO2013/011757
PCT Pub. Date: Jan. 24, 2013

(65) Prior Publication Data
US 2014/0129167 A1    May 8, 2014

(30) Foreign Application Priority Data

Jul. 19, 2011  (JP) .................................. 2011-157905

(51) Int. Cl.
*G01R 33/02* (2006.01)
*G01R 33/07* (2006.01)
(Continued)

(52) U.S. Cl.
CPC ........... *G01R 33/02* (2013.01); *G01R 33/0064* (2013.01); *G01R 33/075* (2013.01); *G06F 17/5009* (2013.01); *G06F 17/5036* (2013.01); *G06F 2217/16* (2013.01); *Y02T 10/82* (2013.01)

(58) Field of Classification Search
CPC ...................................................... G01R 33/02
USPC ................ 324/207.15, 320; 335/216; 702/65
See application file for complete search history.

(56) References Cited

U.S. PATENT DOCUMENTS 6,037,850 A * 3/2000 Honmei ............. G01R 33/3815
324/320

2011/0181274 A1    7/2011 Tachibana et al.

FOREIGN PATENT DOCUMENTS

JP        2984108 B2      9/1999
JP    2004-294123 A    10/2004
(Continued)

OTHER PUBLICATIONS

International Search Report with English translation dated Jul. 3, 2012 (3 pages).
(Continued)

*Primary Examiner* — Lam Nguyen
(74) *Attorney, Agent, or Firm* — Crowell & Moring LLP

(57) ABSTRACT

The present invention provides a magnetic field analysis program and a magnetic field analysis method for calculating inductance related to an AC magnetic field superimposed on a DC magnetic field with a high degree of accuracy at high speed. The magnetic field analysis program is a program for analyzing an AC magnetic field through a frequency response analysis, and causes a computer to carry out: a process of inputting a DC magnetic flux density or a DC magnetic field strength, the amplitude and the frequency of an alternating current, and the initial magnetization curve of the magnetic material of an analysis object, calculating a DC magnetic field strength when a DC magnetic flux density is input, and calculating a DC magnetic flux density when a DC magnetic field strength is input (S100); a process of calculating an AC magnetic flux density and an AC magnetic field strength by carrying out the frequency response analysis using the amplitude and the frequency of the alternating current (S104); and a process of finding such a solution that the sum of the maximum value of the AC magnetic flux density obtained through the frequency response analysis and the DC magnetic flux density becomes equal to the magnetic flux density determined from the sum of the maximum value of the AC magnetic field strength obtained through the frequency response analysis and the DC magnetic field strength, and the initial magnetization curve, with a desired degree of accuracy (S105, S106).

7 Claims, 5 Drawing Sheets

(51) Int. Cl.
  *G06F 17/50* (2006.01)
  *G01R 33/00* (2006.01)

(56) References Cited

FOREIGN PATENT DOCUMENTS

| JP | 2005-207900 A | 8/2005 |
|----|---------------|--------|
| JP | 2006-209273 A | 8/2006 |
| JP | 2010-122089 A | 6/2010 |
| WO | WO 2010/038799 A1 | 4/2010 |

OTHER PUBLICATIONS

"158—Superimposed Direct Current Characteristic Analysis of a Reactor That Accounts for Minor Hysteresis Loops" JMAG Application Catalog, Simulation Technology for Electromechanical Design, 1 page, 2006.

* cited by examiner

MAGNETIC FIELD ANALYSIS PROGRAMS AND MAGNETIC FIELD ANALYSIS METHODS

TECHNICAL FIELD

The present invention relates to a magnetic field analysis program and a magnetic field analysis method for calculating inductance of electrical equipment such as a reactor or a motor at high speed.

BACKGROUND ART

A reactor is used while an alternating current is superimposed on a direct current. If the fundamental wave current component is regarded approximately as a direct current, a phenomenon in which a high-frequency noise current is superimposed while a motor or a generator is operating can be regarded as a situation where an alternating current is superimposed on a direct current. Therefore, when electrical equipment such as a reactor or a motor is designed, inductance related to an alternating current superimposed on a direct current, or inductance related to an AC magnetic field superimposed on a DC magnetic field, is required to be calculated with a high degree of accuracy at high speed.

As methods for calculating inductance related to an alternating current superimposed on a direct current, various methods have been suggested. For example, by the technique disclosed in PTL 1, the operating point for a predetermined direct current is determined by a magnetic field analysis simulator, and the result is set as the initial value. Meanwhile, incremental magnetic permeability is determined from a table indicating a relationship between a predetermined magnetic flux density and incremental magnetic permeability, and an alternating current analysis is carried out to obtain an inductance value. By this method, however, a transient analysis (an analysis method by which a magnetic field is analyzed at each moment while the clock is set forward little by little, and this step is repeated a number of times) is carried out in an alternating current analysis after the operating point is determined. Therefore, a long analysis time is required.

By the techniques disclosed in PTL 2 and PTL 3, a transient analysis is not carried out, and high speed is achieved by calculating inductance through a single static magnetic field analysis. However, accuracy of the calculation is poor, since the eddy current flowing in the iron core is not taken into account. In view of this, PTL 4 discloses a technique by which incremental magnetic permeability having the influence of the eddy current taken into account is actually measured by using a ring-shaped sample, and a magnetic field analysis is carried out by using the incremental magnetic permeability, so as to take into account the influence of the eddy current in a single static magnetic field analysis. However, the process is complicated, and calculation accuracy is limited.

Therefore, programs have been suggested recently, such as a commercially-available magnetic field analysis program for carrying out an alternating current analysis after determination of an operating point through a higher-speed frequency response analysis (an analysis method for analyzing steady states in complex-number domains on the assumption that a magnetic flux density varies sinusoidally with time when a sinusoidal current is input), instead of a transient analysis (see NPTL 1). However, accurate modeling of a relationship between the initial magnetization curve and a minor loop is hardly realized. Specifically, by the magnetic field analysis program disclosed in NPTL 1, modeling is performed so that the magnetic field becomes larger or smaller from a point on the initial magnetization curve, though a minor loop should be formed so that the magnetic field becomes smaller from a point on the initial magnetization curve. As a result, there remains a program that a solution different from that in an actual phenomenon is found, with the upper endpoint of the minor loops not existing on the initial magnetization curve.

CITATION LIST

Patent Literatures

PTL 1: WO 2010/038799
PTL 2: JP 2004-294123 A
PTL 3: JP 2010-122089 A
PTL 4: JP 2984108 B1

Non-Patent Literature

NPTL 1: JMAG Application Catalog No. 158, "Superimposed Direct Current Characteristic Analysis of a Reactor That Accounts for Minor Hysteresis Loops", [online], JSOL Corporation, Dec. 27, 2010, [Search conducted on Jun. 21, 2011], Internet Site <URL: http://www.jmag-international.com/jp/catalog/158_Reactor_S uperImposedDirectCurrent.html>

SUMMARY OF INVENTION

Technical Problem

As described above, by any conventional technique, it is difficult to perform a high-speed calculation and a high-accuracy calculation of inductance at the same time in a system in which an AC magnetic field is superimposed on a DC magnetic field. Therefore, conventional techniques are not convenient for practical use.

An object of the invention is to provide a magnetic field analysis program and a magnetic field analysis method for calculating inductance related to an AC magnetic field superimposed on a DC magnetic field with a high degree of accuracy at high speed.

Solution to Problem

A magnetic field analysis program according to the present invention is a magnetic field analysis program for analyzing an AC magnetic field through a frequency response analysis, and has the following features.

The magnetic field analysis program causes a computer to carry out: a process of inputting a DC magnetic flux density or a DC magnetic field strength, amplitude and frequency of an alternating current, and an initial magnetization curve of a magnetic material of an analysis object by using an input means, calculating a DC magnetic field strength from a DC magnetic flux density and the initial magnetization curve when the DC magnetic flux density is input, calculating a DC magnetic flux density from a DC magnetic field strength and the initial magnetization curve when the DC magnetic field strength is input, and storing the DC magnetic flux density, the DC magnetic field strength, the amplitude and the frequency of the alternating current, and the initial magnetization curve into a storage means; a process of calculating an AC magnetic flux density and an AC magnetic field strength by carrying out the frequency response analysis using the amplitude and the frequency of the alternating current; and a process of finding such a solution that a sum of a maximum value of the AC magnetic flux density obtained through the frequency response analysis and the DC magnetic flux density becomes equal to a magnetic flux density determined from a sum of a maximum value of the AC magnetic field strength obtained through the frequency response analysis and the DC magnetic field strength, and the initial magnetization curve, with a degree of accuracy read from the storage means.

Advantageous Effects of Invention

According to the invention, inductance related to an AC magnetic field superimposed on a DC magnetic field can be calculated with a high degree of accuracy at high speed.

DESCRIPTION OF EMBODIMENTS

Figure 1:
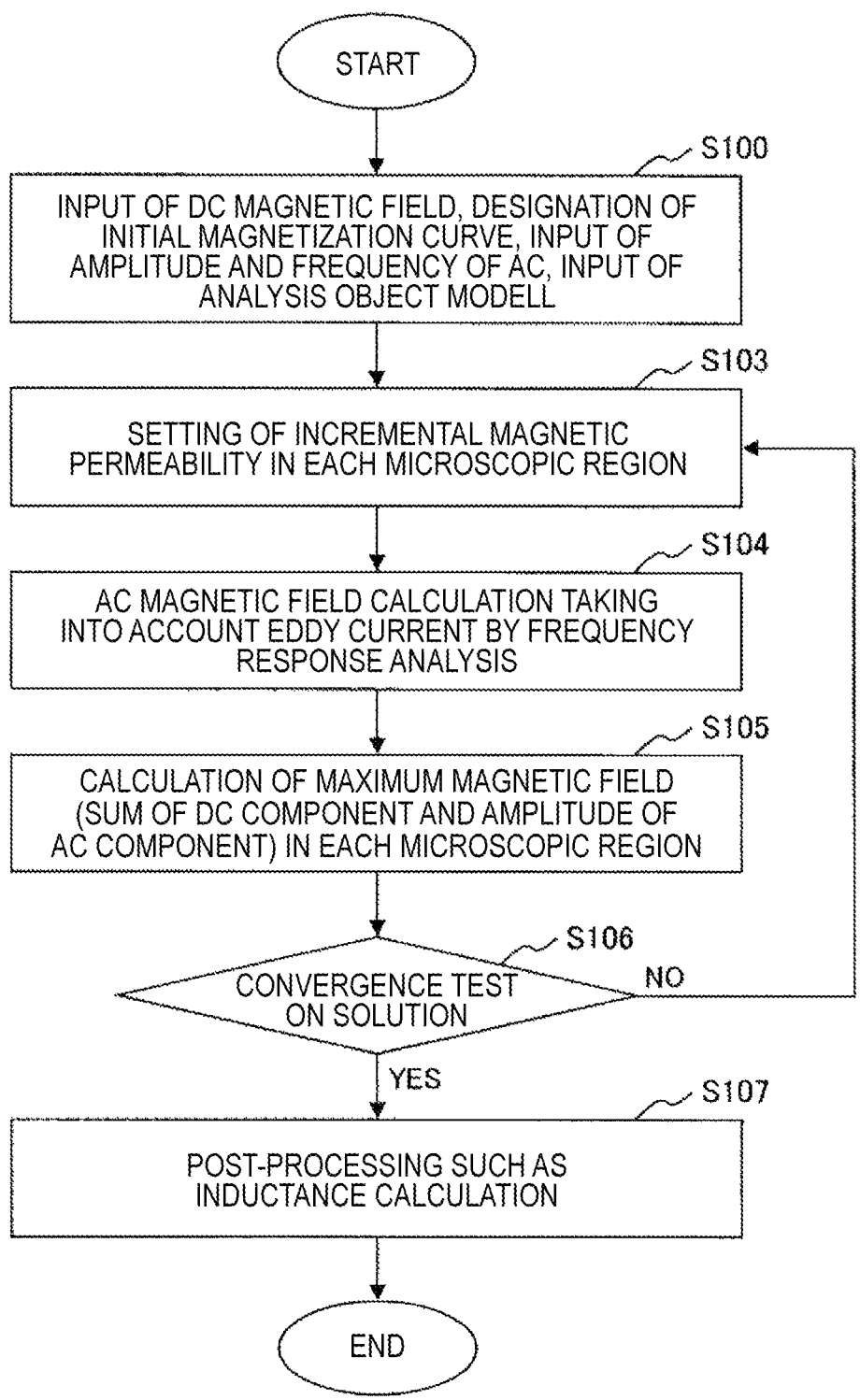
FIG. 1 is a flowchart showing a magnetic field analysis program according to a first embodiment.

A magnetic field analysis program and a magnetic field analysis method according to the present invention realize a high-speed and high-precision magnetic field analysis by using a frequency response analysis as an alternating current analysis after determining an operating point, and finding such a solution that the upper end point of the minor loop exists on the initial magnetization curve. Specifically, two kinds of methods are used depending on purposes. When emphasis is put on simpleness of an analysis, such a solution that the upper endpoint of the minor loop exists on the initial magnetization curve is found by repeating a frequency response analysis more than once while adjusting incremental magnetic permeability with reference to the initial magnetization curve. In this manner, analysis accuracy can be maintained, and an analysis can be easily carried out, since preparation for a database about incremental magnetic permeability is not required. When emphasis is put on analysis accuracy, on the other hand, the minor loop center point is determined by performing a static magnetic field analysis once prior to a frequency response analysis, and the frequency response analysis is then carried out on the basis of the minor loop center point. In this manner, a high-accuracy analysis that is more similar to an actual physical phenomenon can be realized.

According to the present invention, a highly accurate solution can be found more easily than by a conventional analysis method, and a solution with a high degree of accuracy that cannot be achieved by a conventional analysis method can be obtained. A high-speed calculation and a high-accuracy calculation of inductance can be performed at the same time. Accordingly, modeling of superimposed direct current characteristics of a reactor or low-to-high frequency characteristics of a motor can be performed with a high degree of accuracy in a short period of time. By using such a model, high-frequency phenomena such as electromagnetic noise and an inverter surge can be evaluated, and it becomes possible to contribute to optimization of the design of a motor drive or shortening of a developing period. A magnetic field analysis program and a magnetic field analysis method of the present invention can be applied not only to analyses in motors and reactors but also to analyses of induction heating apparatuses.

A magnetic field analysis program and a magnetic field analysis method according to the present invention are implemented with a computer that includes an input device, an output device, an arithmetic operation device, and a storage device. Data necessary for analyses is input through the input device such as a keyboard or a mouse, and analysis results can be output to the output device such as a display that displays the results. The arithmetic operation device controls the computer, and carries out magnetic field analyses and other calculations. Input data and data obtained through analyses can be stored in the storage device such as a hard disk or a memory.

By a magnetic field analysis program and a magnetic field analysis method according to the present invention, an analysis object model divided into microscopic regions, a DC magnetic flux density or a DC magnetic field strength to serve as an offset, an AC magnetic flux density or an AC magnetic field strength, and an initial magnetization curve are input, a magnetic field analysis of the microscopic regions is carried out, and inductance related to an AC magnetic field superimposed on a DC magnetic field is calculated. Instead of a DC magnetic flux density or a DC magnetic field strength to serve as an offset, a direct current to serve as an offset may be input.

Embodiments of a magnetic field analysis program according to the present invention are described below.

Figure 2:
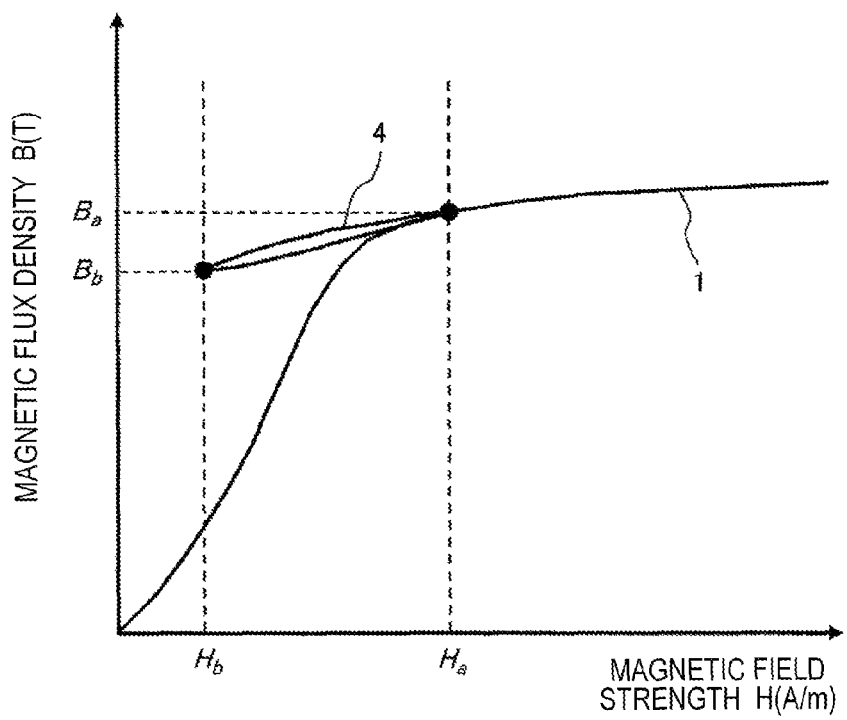
FIG. 2 is a schematic view illustrating a relationship between a magnetic flux density B and a magnetic field strength H in a typical magnetic material.
Figure 3:
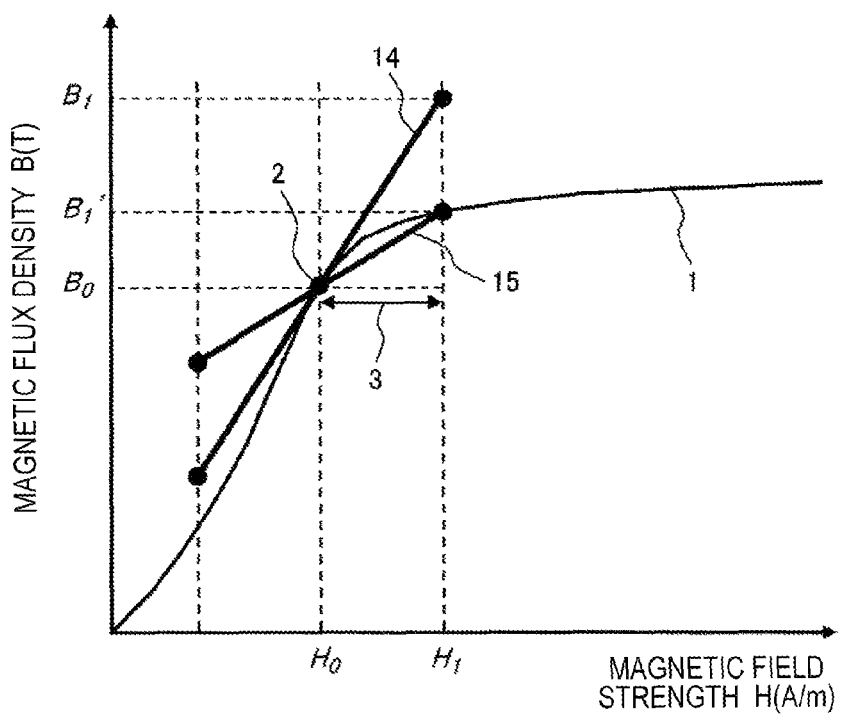
FIG. 3 is a diagram illustrating a locus of a magnetic field determined by the magnetic field analysis program according to the first embodiment in the B-H plane.

FIG. 1 is a flowchart showing a first embodiment of a magnetic field analysis program according to the present invention. FIG. 2 is a schematic view illustrating a relationship between a magnetic flux density B and a magnetic field strength H in a typical magnetic material, and shows an initial magnetization curve and a minor loop. FIG. 3 is a diagram showing a locus of a magnetic field in the B-H plane determined by the magnetic field analysis program according to this embodiment, and illustrates a relationship between the magnetic flux density B and the magnetic field strength H.

In FIG. 2, the DC magnetic field is determined by an initial magnetization curve 1. An AC magnetic field superimposed on the initial magnetization curve 1 forms a locus in the B-H plane, following a minor loop 4. The slope of the minor loop 4, or physical quantity μ expressed by the equation (1), is called incremental magnetic permeability.

$$\mu = (B_a - B_b)/(H_a - H_b) \quad (1)$$

$H_a$ and $H_b$ represent the maximum magnetic field strength and the minimum magnetic field strength of the minor loop 4, and $B_a$ and $B_b$ represent the magnetic flux densities corresponding to $H_a$ and $H_b$ on the minor loop 4, respectively. Hereinafter, a "magnetic field" means a magnetic flux density and/or a magnetic field strength.

In this embodiment, the physical phenomenon illustrated in FIG. 2 is analyzed in accordance with the flowchart shown in FIG. 1. By this analysis, the magnetic field forms a locus 15 shown in FIG. 3 in the B-H plane, and the upper end point of the minor loop exists on the initial magnetization curve 1 (the line segment indicating the locus 15 represents the minor loop).

The respective steps shown in FIG. 1 are described below.

First, in step S100, an analysis object model divided into microscopic regions, a DC magnetic field, the amplitude and the frequency of an alternating current, and the initial magnetization curve of a magnetic material of the analysis object model are input. In a case where the input DC magnetic field is only the magnetic flux density $B_0$ or the magnetic field strength $H_0$, $H_0$ or $B_0$ corresponding to the input $B_0$ or $H_0$ is determined based on the initial magnetization curve. As for the initial magnetization curve, a magnetization curve stored in the magnetic field analysis program may be designated and input, or each individual analyst may prepare and input an initial magnetization curve. More than one initial magnetization curve may be input depending on the magnetic material of the analysis object model.

In performing those inputs, an input device provided in the computer that executes the magnetic field analysis program can be used. The analysis object model, the DC magnetic field (the DC magnetic flux density $B_0$ and the DC magnetic field strength $H_0$), the amplitude and the frequency of the alternating current, and the initial magnetization curve are stored into a storage device.

In step S103, incremental magnetic permeability in each microscopic region of the analysis object model is set. Normally, the operating point varies among microscopic regions, and accordingly, incremental magnetic permeability also varies among microscopic regions. Incremental magnetic permeability is calculated and set from the slope of the initial magnetization curve at the value of the DC magnetic field that has been input in step S100, for example.

In step S104, the AC magnetic field is calculated through a frequency response analysis using the amplitude and the frequency of the alternating current that has been input in step S100 and the incremental magnetic permeability that has been set in step S103. In calculating the AC magnetic field through the frequency response analysis, an existing method can be used.

FIG. 3 illustrates an example of the locus of the magnetic field in the B-H plane in this first frequency response analysis, in the form of the line segment indicating the locus 14. The line segment indicating the locus 14 represents the minor loop. Since a frequency response analysis, instead of a static magnetic field analysis, is carried out, the eddy current flowing in the iron core or winding can be taken into account, and accordingly, accuracy is increased. Also, since a frequency response analysis, instead of a transient analysis, is carried out, analysis time can be shortened. However, non-linearity such as magnetic saturation is not taken into account in this stage, and therefore, a convergence calculation is performed in the next and later steps.

In step S105, the maximum magnetic field strength $H_1$ and the maximum magnetic flux density $B_1$ in each microscopic region are calculated. $H_1$ is calculated from the DC magnetic field strength $H_0$ that has been input in step S100 and the amplitude of the AC magnetic field strength ($H_1-H_0$) that has been calculated in step S104. $B_1$ is calculated from the DC magnetic flux density $B_0$ that has been input in step S100, the amplitude of the AC magnetic field strength ($H_1-H_0$) that has been calculated in step S104, and the incremental magnetic permeability that has been set in step S103. With the incremental magnetic permeability being represented by $\mu_1$, $B_1$ is expressed as shown in the equation (2).

$$B_1 = B_0 + \mu_1 (H_1 - H_0) \tag{2}$$

Referring to FIG. 3, the maximum magnetic flux density $B_1$ is the value obtained by adding the value obtained by multiplying the amplitude 3 (or $H_1-H_0$) of the AC magnetic field by the incremental magnetic permeability $\mu_1$ (the slope of the initial magnetization curve 1 at an operating point 2, for example), to the DC magnetic flux density $B_0$.

In step S106, a convergence test is carried out on the solution. This test is carried out to determine whether the value of the maximum magnetic flux density $B_1$ obtained in step S105 matches a point on the initial magnetization curve with a desired degree of accuracy. Referring to FIG. 3, a test is carried out to determine whether the maximum magnetic flux density $B_1$ matches the magnetic flux density $B_1'$ corresponding to the maximum magnetic field strength $H_1$ on the initial magnetization curve 1 with a desired degree of accuracy. As for the desired degree of accuracy, a default value may be used, or a value that has been input by an analyst may be used. The desired degree of accuracy is stored beforehand in the storage device.

If convergence is not detected in step S106, the operation returns to step S103, and the incremental magnetic permeability is re-set and updated. In re-setting the incremental magnetic permeability, the following equation (3) is used, for example.

$$\mu_2 = (B_1' - B_0)/(H_1 - H_0) \tag{3}$$

Here, $\mu_2$ is the re-set incremental magnetic permeability.

However, if the incremental magnetic permeability changes too rapidly, the solution might not converge, and therefore, the change is normally slowed down by introducing a relaxation coefficient $\nu$ as shown in the equation (4) or (5).

$$\mu_2 = \mu_1 + \nu((B_1' - B_0)/(H_1 - H_0) - \mu_1) \tag{4}$$

$$\mu_2 = ((B_1' - B_0)/(H_1 - H_0))^\nu \mu_1^{1-\nu} \tag{5}$$

The relaxation coefficient $\nu$ is a value that has been determined in advance, and is a real number in the range expressed as $0 < \nu \leq 1$, such as 0.1.

Steps S104 and S105 are again carried out by using the incremental magnetic permeability that has been re-set in the above described manner, and a test is carried out in step S106. This iterative calculation is repeated normally five times or less prior to convergence, though the number of repetitions depends on a requested degree of accuracy. After the iterative calculation converges, the locus 15 of the magnetic field formed in the B-H plane at this point has the upper end point of the minor loop on the initial magnetization curve 1 with the desired degree of accuracy, as shown in FIG. 3.

After it is determined that the iterative calculation has converged, the operation moves on to step S107, post-processing such as an inductance calculation is performed, and the analysis of a certain DC component and a certain AC component is completed. In practice, this analysis is often followed by an analysis under different conditions. The inductance calculation can be performed by a conventional method using the value of the obtained magnetic field.

The magnetic field analysis program according to this embodiment is characteristically capable of calculating inductance related to an AC magnetic field superimposed on a DC magnetic field with a high degree of accuracy at high speed, and can be readily executed, since there is no need for a table (a database) indicating a relationship between a magnetic flux density and incremental magnetic permeability.

Next, a second embodiment of a magnetic field analysis program according to the present invention is described.

Figure 4:
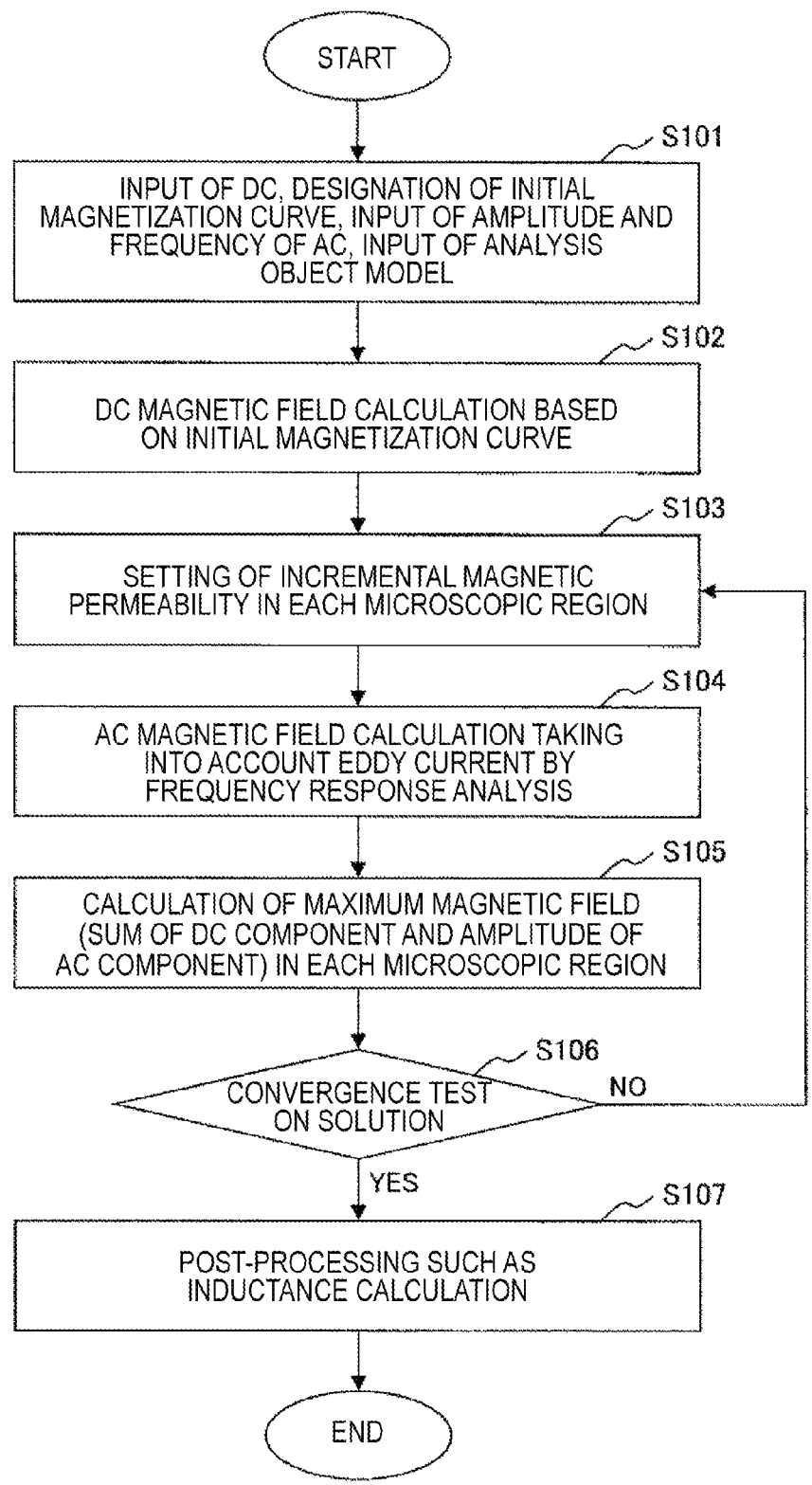
FIG. 4 is a flowchart showing a magnetic field analysis program according to a second embodiment.

FIG. 4 is a flowchart showing the second embodiment of a magnetic field analysis program according to the present invention. The respective steps shown in FIG. 4 are described below.

First, in step S101, an analysis object model divided into microscopic regions, a direct current, the amplitude and the frequency of an alternating current, and the initial magnetization curve of the magnetic material of the analysis object model are input. As for the initial magnetization curve, a magnetization curve stored in the magnetic field analysis program may be designated and input, or each individual analyst may prepare and input an initial magnetization curve. More than one initial magnetization curve may be input depending on the magnetic material of the analysis object model. This embodiment differs from the first embodiment in that the DC magnetic field to be input is replaced with a direct current for generating the DC magnetic field.

In performing those inputs, an input device provided in the computer that executes the magnetic field analysis program can be used. The analysis object model, the direct current, the amplitude and the frequency of the alternating current, and the initial magnetization curve are stored into a storage device.

In step S102, a DC magnetic field generated from the direct current that has been input in step S101 is calculated based on the initial magnetization curve, and a magnetic flux density $B_0$ and a magnetic field strength $H_0$ are obtained. In calculating the DC magnetic field, a conventional method can be used. The obtained magnetic flux density $B_0$ and magnetic field strength $H_0$ are stored into the storage device.

Step S103 and the later steps are basically the same as those of the first embodiment, and therefore, explanation of them is not repeated herein. However, this embodiment differs from the first embodiment in that the DC magnetic field to be used in steps S103 and S105 is not input directly, but is calculated in step S102.

Like the magnetic field analysis program according to the first embodiment, the magnetic field analysis program according to this embodiment is characteristically capable of calculating inductance related to an AC magnetic field superimposed on a DC magnetic field with a high degree of accuracy at high speed. Furthermore, the magnetic field analysis program according to this embodiment can be readily executed, since there is no need for a table (a database) indicating a relationship between a magnetic flux density and incremental magnetic permeability.

Next, a third embodiment of a magnetic field analysis program according to the present invention is described.

Figure 5:
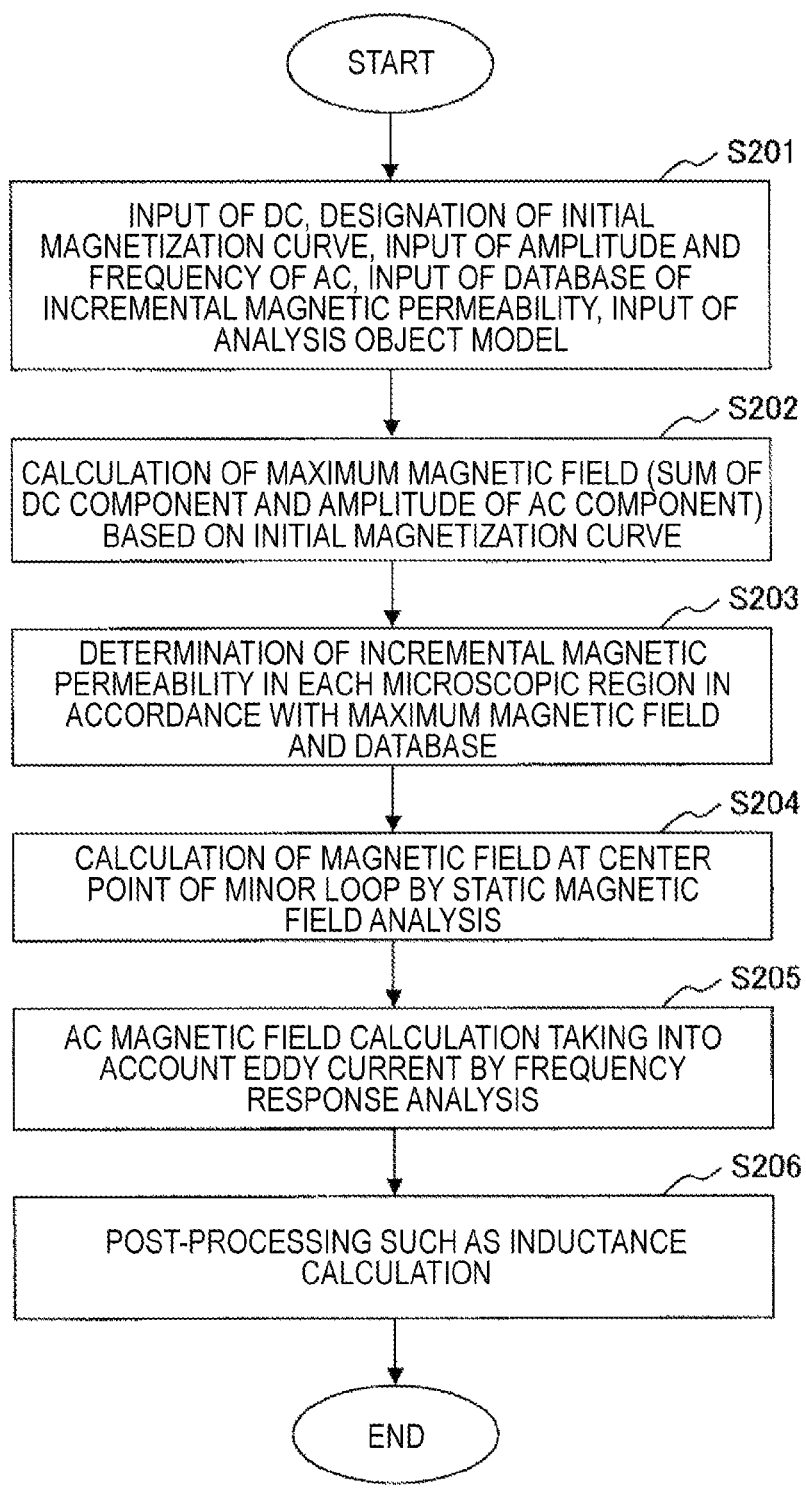
FIG. 5 is a flowchart showing a magnetic field analysis program according to a third embodiment.
Figure 6:
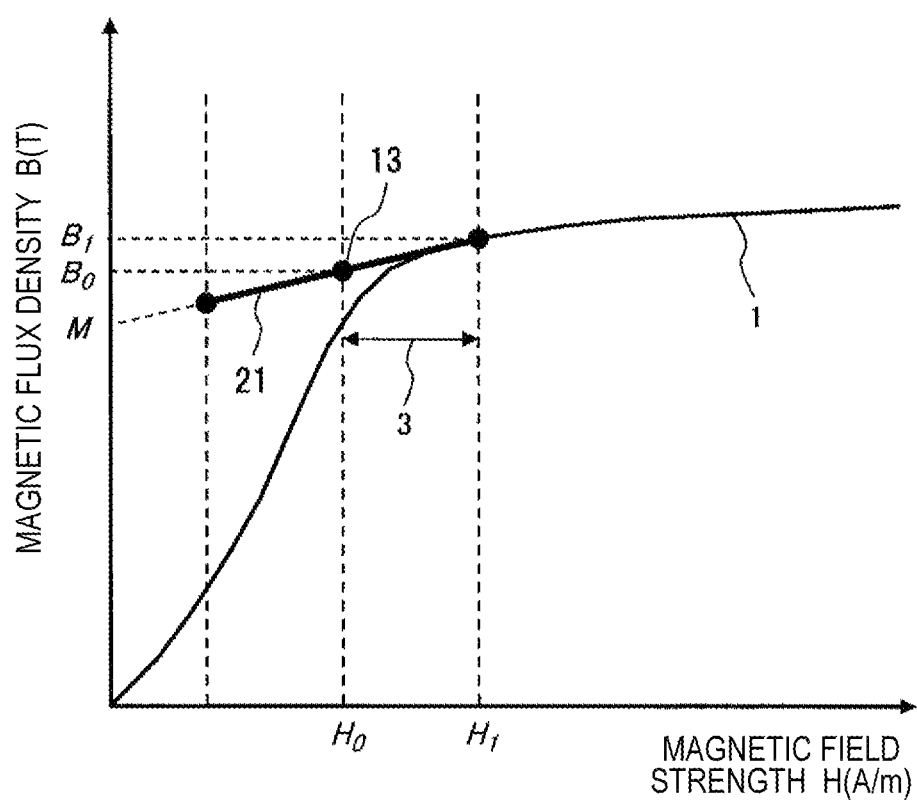
FIG. 6 is a diagram illustrating a locus of a magnetic field determined by the magnetic field analysis program according to the third embodiment in the B-H plane.

FIG. 5 is a flowchart showing the third embodiment of a magnetic field analysis program according to the present invention. FIG. 6 is a diagram showing a locus of a magnetic field in the B-H plane determined by the magnetic field analysis program according to this embodiment, and illustrates a relationship between a magnetic flux density B and a magnetic field strength H.

In this embodiment, a minor loop center point 13 (see FIG. 6) that does not exist on an initial magnetization curve 1 is determined, and a frequency response analysis on the basis of the center point is then carried out, to put the upper end point of the minor loop on the initial magnetization curve 1 with a desired degree of accuracy. Accordingly, an analysis that forms a minor loop with a higher degree of accuracy can be realized.

The respective steps shown in FIG. 5 are described below.

In step S201, an analysis object model divided into microscopic regions, a direct current, the amplitude and the frequency of an alternating current, and the initial magnetization curve of the magnetic material of the analysis object model are input. Further, as for the magnetic material of the analysis object model, a table (hereinafter referred to as the "database") indicating a relationship between a magnetic flux density and incremental magnetic permeability or a relationship between a magnetic field strength and incremental magnetic permeability is input. As for the initial magnetization curve and the data base, a magnetization curve and a database that are set in the magnetic field analysis program may be designated and input, or may be prepared and input by each individual analyst. More than one initial magnetization curve and more than one database may be input depending on the magnetic material of the analysis object model.

In performing those inputs, an input device provided in the computer that executes the magnetic field analysis program can be used. The analysis object model, the direct current, the amplitude and the frequency of the alternating current, the initial magnetization curve, and the database are stored into a storage device.

In step S202, the magnetic field (the maximum magnetic field) corresponding to the maximum current generated by adding the amplitude of the alternating current to the direct current is calculated through a static magnetic field analysis based on the initial magnetization curve. In the static magnetic field analysis, a conventional method can be used. Influence of an eddy current that might be caused by the alternating current is ignored herein. The resultant maximum magnetic flux density is represented by $B_1$, and the resultant maximum magnetic field strength is represented by $H_1$.

In step S203, incremental magnetic permeability $\mu_1$ in each microscopic region of the analysis object model is determined from the resultant maximum magnetic flux density $B_1$ or the resultant maximum magnetic field strength $H_1$ by using the database that has been input in step S201.

In step S204, the magnetic field (the magnetic flux density $B_0$ and the magnetic field strength $H_0$) corresponding to the direct current is calculated through a static magnetic field analysis using the incremental magnetic permeability $\mu_1$, the maximum magnetic flux density $B_1$, and the maximum magnetic field strength $H_1$. In this static magnetic field analysis, a residual magnetic flux density M ($=B_1-\mu_1 H_1$) calculated from the incremental magnetic permeability $\mu_1$, the maximum magnetic flux density $B_1$, and the maximum magnetic field strength $H_1$ may be used. In the static magnetic field analysis, a conventional method can be used. The resultant magnetic flux density $B_0$ and the resultant magnetic field strength $H_0$ are the magnetic field that determines the minor loop center point 13 (see FIG. 6). When the static magnetic field analysis to calculate the minor loop center point 13 is carried out, a measure to maintain accuracy such as a sufficient reduction of the convergence determining value is taken so that the upper end point of the minor loop to be obtained in the next step S205 is placed on the initial magnetization curve 1 with a desired degree of accuracy. As the desired degree of accuracy, a default value may be used, or a value that has been input by an analyst may be used. The desired degree of accuracy is stored into the storage device in advance. The minor loop center point 13 (or the magnetic flux density $B_0$ and the magnetic field strength $H_0$) is calculated for each microscopic region of the analysis object model.

In step S205, an AC magnetic field is calculated through a frequency response analysis using the incremental magnetic permeability $\mu_1$ that has been determined in step S203. This AC magnetic field calculation through a frequency response analysis can be performed in the same manner as in step S104 of the first embodiment.

FIG. 6 illustrates an example of the locus of the magnetic field formed by this AC magnetic field calculation in the B-H plane, in the form of a line segment indicating a locus 21. The line segment indicating the locus 21 represents the minor loop. Since a frequency response analysis, instead of a static magnetic field analysis, is carried out, the eddy current that flows in the iron core and winding can be taken into account, and accordingly, accuracy is increased. Also, since a frequency response analysis, instead of a transient analysis, is carried out, analysis time can be shortened. Furthermore, this embodiment differs from the first and second embodiments in that the maximum magnetic field (the magnetic field strength $H_1$ at the magnetic flux density $B_1$, or the upper end point of the minor loop) is already located on the initial magnetization curve, and therefore, a convergence calculation is unnecessary. Accordingly, the analysis time becomes even shorter.

Lastly, in step S206, post-processing such as an inductance calculation is performed, and the analysis of a certain DC component and a certain AC component is completed. In practice, this analysis is often followed by an analysis under different conditions. The inductance calculation can be performed by a conventional method using the value of the obtained magnetic field.

This embodiment is the same as a conventional technique in that the database about a relationship between a magnetic flux density and incremental magnetic permeability or a relationship between a magnetic field strength and incremental magnetic permeability, but further has a feature that increases analysis accuracy by adding the static magnetic field analysis to determine the minor loop center point.

REFERENCE SIGNS LIST

1 initial magnetization curve
2 operating point
3 amplitude of AC magnetic field
4 minor loop
13 minor loop center point
14 locus of magnetic field formed by first frequency response analysis in first embodiment
15 locus of magnetic field formed by last frequency response analysis in first embodiment
21 locus of magnetic field formed by frequency response analysis in third embodiment

The invention claimed is:

1. A magnetic field analysis program for analyzing an AC magnetic field through a frequency response analysis,
the magnetic field analysis program causing a computer to carry out:
a process of inputting a DC magnetic flux density or a DC magnetic field strength, amplitude and frequency of an alternating current, and an initial magnetization curve of a magnetic material of an analysis object by using an input means, calculating a DC magnetic field strength from a DC magnetic flux density and the initial magnetization curve when the DC magnetic flux density is input, calculating a DC magnetic flux density from a DC magnetic field strength and the initial magnetization curve when the DC magnetic field strength is input, and storing the DC magnetic flux density, the DC magnetic field strength, the amplitude and the frequency of the alternating current, and the initial magnetization curve into a storage means;
a process of calculating an AC magnetic flux density and an AC magnetic field strength by carrying out the frequency response analysis using the amplitude and the frequency of the alternating current; and
a process of finding such a solution that a sum of a maximum value of the AC magnetic flux density obtained through the frequency response analysis and the DC magnetic flux density becomes equal to a magnetic flux density determined from a sum of a maximum value of the AC magnetic field strength obtained through the frequency response analysis and the DC magnetic field strength, and the initial magnetization curve, with a degree of accuracy read from the storage means.

2. The magnetic field analysis program according to claim 1, which causes the computer to carry out:
a process of inputting a direct current by using the input means, instead of inputting the DC magnetic flux density or the DC magnetic field strength; and
a process of calculating the DC magnetic flux density and the DC magnetic field strength by using the direct current and the initial magnetization curve.

3. The magnetic field analysis program according to claim 1, wherein the process of calculating the AC magnetic flux density and the AC magnetic field strength includes carrying out the frequency response analysis using incremental magnetic permeability of the magnetic material as well as the amplitude and the frequency of the alternating current, and finding a solution by repeating the frequency response analysis while updating the incremental magnetic permeability until the sum of the maximum value of the AC magnetic flux density obtained through the frequency response analysis and the AC magnetic flux density becomes equal to the magnetic flux density determined from the sum of the maximum value of the AC magnetic field strength obtained through the frequency response analysis and the DC magnetic field strength, and the initial magnetization curve, with the degree of accuracy read from the storage means.

4. The magnetic field analysis program according to claim 3, which causes the computer to carry out:
a process of inputting a direct current by using the input means, instead of inputting the DC magnetic flux density or the DC magnetic field strength; and
a process of calculating the DC magnetic flux density and the DC magnetic field strength by using the direct current and the initial magnetization curve.

5. A magnetic field analysis program for analyzing an AC magnetic field through a frequency response analysis,
the magnetic field analysis program causing a computer to carry out:
a process of inputting a direct current, amplitude and frequency of an alternating current, an initial magnetization curve of a magnetic material of an analysis object, and a database showing a relationship between a magnetic flux density and incremental magnetic permeability of the magnetic material or a relationship between a magnetic field strength and the incremental magnetic permeability of the magnetic material, by using an input means, and storing the direct current, the amplitude and the frequency of the alternating current, the initial magnetization curve, and the database into a storage means;

a process of calculating a maximum magnetic flux density and a maximum magnetic field strength by carrying out a static magnetic field analysis using a sum of the direct current and the amplitude of the alternating current, and the initial magnetization curve;

a process of determining the incremental magnetic permeability of the magnetic material from the database and the maximum magnetic flux density or the maximum magnetic field strength;

a process of calculating a magnetic flux density and a magnetic field strength corresponding to the direct current from the maximum magnetic flux density, the maximum magnetic field strength, and the incremental magnetic permeability; and a process of calculating an AC magnetic flux density and an AC magnetic field strength by carrying out the frequency response analysis using the amplitude and the frequency of the alternating current, and the incremental magnetic permeability.

6. A magnetic field analysis method for analyzing an AC magnetic field through a frequency response analysis by using a computer that includes an input means, an arithmetic operation means, and a storage means, the magnetic field analysis method comprising:

the step of inputting a DC magnetic flux density or a DC magnetic field strength, amplitude and frequency of an alternating current, and an initial magnetization curve of a magnetic material of an analysis object, the step of inputting being carried out by the input means;

the step of calculating a DC magnetic field strength from a DC magnetic flux density and the initial magnetization curve when the DC magnetic flux density is input, and calculating a DC magnetic flux density from a DC magnetic field strength and the initial magnetization curve when the DC magnetic field strength is input, the step of calculating being carried out by the arithmetic operation means;

the step of storing the DC magnetic flux density, the DC magnetic field strength, the amplitude and the frequency of the alternating current, and the initial magnetization curve, the step of storing being carried out by the storage means;

the step of calculating an AC magnetic flux density and an AC magnetic field strength by carrying out the frequency response analysis using the amplitude and the frequency of the alternating current, and incremental magnetic permeability of the magnetic material, the step of calculating being carried out by the arithmetic operation means; and the step of finding a solution by repeating the frequency response analysis while updating the incremental magnetic permeability until a sum of a maximum value of the AC magnetic flux density obtained through the frequency response analysis and the DC magnetic flux density becomes equal to a magnetic flux density determined from a sum of a maximum value of the AC magnetic field strength obtained through the frequency response analysis and the DC magnetic field strength, and the initial magnetization curve, with a degree of accuracy read from the storage means, the step of finding a solution being carried out by the arithmetic operation means.

7. A magnetic field analysis method for analyzing an AC magnetic field through a frequency response analysis by using a computer that includes an input means, an arithmetic operation means, and a storage means, the magnetic field analysis method comprising:

the step of inputting a direct current, amplitude and frequency of an alternating current, an initial magnetization curve of a magnetic material of an analysis object, and a database showing a relationship between a magnetic flux density and incremental magnetic permeability of the magnetic material or a relationship between a magnetic field strength and the incremental magnetic permeability of the magnetic material, the step of inputting being carried out by the input means;

the step of storing the direct current, the amplitude and the frequency of the alternating current, the initial magnetization curve, and the database, the step of storing being carried out by the storage means;

the step of calculating a maximum magnetic flux density and a maximum magnetic field strength by carrying out a static magnetic field analysis using a sum of the direct current and the amplitude of the alternating current, and the initial magnetization curve, the step of calculating being carried out by the arithmetic operation means;

the step of determining the incremental magnetic permeability of the magnetic material from the database and the maximum magnetic flux density or the maximum magnetic field strength, the step of determining being carried out the arithmetic operation means;

the step of calculating a magnetic flux density and a magnetic field strength corresponding to the direct current from the maximum magnetic flux density, the maximum magnetic field strength, and the incremental magnetic permeability, the step of calculating being carried out by the arithmetic operation means; and the step of calculating an AC magnetic flux density and an AC magnetic field strength by carrying out the frequency response analysis using the amplitude and the frequency of the alternating current, and the incremental magnetic permeability, the step of calculating being carried out by the arithmetic operation means.

* * * * *